United States Patent
Johnson (10) Patent No.: US 11,725,411 B2
(45) Date of Patent: Aug. 15, 2023

(54) NUCLEAR FUEL ASSEMBLY WITH MULTI-PITCH WIRE WRAP

(71) Applicant: TerraPower, LLC, Bellevue, WA (US)

(72) Inventor: Brian C Johnson, Issaquah, WA (US)

(73) Assignee: TERRAPOWER, LLC, Bellevue, WA (US)

( * ) Notice: Subject to any disclaimer, the term of this patent is extended or adjusted under 35 U.S.C. 154(b) by 16 days.

(21) Appl. No.: 17/160,047

(22) Filed: Jan. 27, 2021

(65) Prior Publication Data
US 2022/0051812 A1 Feb. 17, 2022

Related U.S. Application Data

(60) Provisional application No. 63/066,778, filed on Aug. 17, 2020.

(51) Int. Cl.
*G21C 3/322* (2006.01)
*E04H 5/02* (2006.01)
(Continued)

(52) U.S. Cl.
CPC .......... *E04H 5/02* (2013.01); *E04B 1/167* (2013.01); *G21C 3/16* (2013.01); *G21C 3/322* (2013.01); *G21C 3/328* (2013.01); *G21C 3/3432* (2019.01); *G21C 13/028* (2013.01); *G21C 13/093* (2013.01); *G21C 13/10* (2013.01); *G21C 15/18* (2013.01); *G21C 21/02* (2013.01)

(58) Field of Classification Search
CPC ....... G21C 3/338; G21C 3/322; G21C 3/3432
See application file for complete search history.

(56) References Cited

U.S. PATENT DOCUMENTS

2014/0185734 A1* 7/2014 Petroski ............... G21C 3/16
376/434

FOREIGN PATENT DOCUMENTS

| FR | 2281631 | * | 3/1976 | ............ G21C 3/338 |
| GB | 1416703 A | * | 12/1975 | ............ G21C 3/338 |

(Continued)

OTHER PUBLICATIONS

Hishida, Detailed Design Consideration on Wire-Spaced LMFBR Fuel Subassemblies under the Effects of Uncertainties and Non-Nominal Geometries, https://inis.iaea.org/collection/NCLCollectionStore/_Public/12/632/12632960.pdf?r=1&r=1.
(Continued)

*Primary Examiner* — Jack W Keith
*Assistant Examiner* — Joshua C Devorkin
(74) *Attorney, Agent, or Firm* — FisherBroyles, LLP; Jeremy P. Sanders (57) ABSTRACT

A nuclear fuel assembly is constructed with fuel assembly components that are wire wrapped and positioned in hexagonal rings within a fuel assembly duct. The fuel assembly components positioned in an outermost ring of the fuel assembly are wire wrapped with a pitch that is shorter than fuel assembly components positioned at an interior ring of the fuel assembly. The shorter pitch at the outer ring of the fuel assembly increases pressure drop of a coolant fluid at the edge and corner subchannels and thereby reduces the temperature gradient across the fuel assembly, which provides a higher output temperature of the nuclear reactor without substantially increasing peak temperature of the fuel cladding.

14 Claims, 5 Drawing Sheets

(51) Int. Cl.
    *G21C 3/34*          (2006.01)
    *G21C 13/028*      (2006.01)
    *G21C 13/093*      (2006.01)
    *G21C 13/10*       (2006.01)
    *G21C 15/18*       (2006.01)
    *G21C 3/16*         (2006.01)
    *G21C 3/328*       (2006.01)
    *G21C 21/02*       (2006.01)
    *E04B 1/16*        (2006.01)

(56) References Cited

FOREIGN PATENT DOCUMENTS

| | | |
|---|---|---|
| GB | 1419072 | 12/1975 |
| JP | 2005083966 A | 9/2003 |

OTHER PUBLICATIONS

Wigeland et al., Fast Reactor Subassembly Design Modifications for Increasing Electricity Generation Efficiency, INL/CON-09-15226, Global 2009, Sep. 2009.

PCT/US2021/020958 International Search Report, date of actual completion of international search report dated Jun. 7, 2021; 3 pages.

PCT/US2021/020958 Written Opinion, date of mailing of search report along with written opinion dated Jun. 17, 2021; 6 pages.

\* cited by examiner

NUCLEAR FUEL ASSEMBLY WITH MULTI-PITCH WIRE WRAP

CROSS-REFERENCE TO RELATED APPLICATIONS

This application claims the benefit of U.S. Provisional Patent Application No. 63/066,778, filed Aug. 17, 2020, entitled "MODULAR MANUFACTURE, DELIVERY, AND ASSEMBLY OF NUCLEAR REACTOR," the contents of which is incorporated herein by reference in its entirety.

BACKGROUND

Nuclear fuel assemblies include fuel pins that are typically wire-wrapped to provide for a predetermined subchannel size, to reduce pin to pin interaction, and improve thermal-hydraulic performance. Typically, a nuclear fuel pin is wrapped by a circular wire in a helical pattern. The diameter of the wire becomes the spacing distance between adjacent nuclear fuel pins and between the fuel pins and the adjacent duct wall.

As coolant flows in the subchannels, there is typically a greater pressure drop in interior subchannels as compared to edge subchannels. Consequently, coolant is able to flow at a higher velocity through the edge subchannels, thus removing heat from the fuel pins adjacent the duct wall more efficiently and more quickly than fuel pins located nearer the center of the fuel assembly.

The thermodynamic result is a temperature gradient across the fuel pins where the fuel pins nearer the center of the fuel assembly have a higher temperature than the fuel pins near the edge of the fuel assembly, which can lead to thermodynamic stresses and strains.

It would be advantageous to reduce the temperature gradient across the fuel pins to improve fuel performance, reduce pin to pin interaction, and increase outlet temperature. These and other features will become readily apparent by reference to the following description and figures.

SUMMARY

According to some embodiments, a fuel assembly for a nuclear reactor includes a first fuel pin having a first wire wrapping, the first wire wrapping having a first pitch; and a second fuel pin having a second wire wrapping, the second wire wrapping having a second pitch, the second pitch being different than the first pitch. Of course, the wire wrapping is equally appliable to other fuel assembly components, such as, for example, neutron reflectors, control rods, fertile fuel, and the like.

In some cases, the second pitch is shorter than the first pitch, and as an example, the second pitch may be half of the first pitch, or one fourth of the first pitch, or some other multiplier factor.

The first fuel pin and the second fuel pin may be located within a fuel duct and the second fuel pin may be positioned closer to a wall of the fuel duct than the first fuel pin. In some cases, a ring of second fuel pins is positioned closer to the wall of the fuel duct than a ring of first fuel pins.

In some embodiments, the second fuel pin is positioned within a fuel duct to increase the outlet temperature of the nuclear reactor.

According to some embodiments, the first fuel pin has a first clocking angle, and the second fuel pin has a second clocking angle different from the first clocking angle. In some cases, clocking angles of various fuel pins are selected to avoid wire to wire interference between adjacent fuel pins.

In some instances, the fuel assembly comprises fissionable fuel. In some cases, the fuel assembly comprises fertile fuel.

In some embodiments, the fuel assembly includes a neutron absorber and the neutron absorber has a second wire wrapping having the second pitch. The neutron absorber may be shaped to be interchangeable with a fuel pin or a control rod.

According to a method for increasing a pressure drop of a coolant fluid within a nuclear fuel assembly in an edge subchannel, the method includes the steps of locating a first fuel assembly component within an inner ring of the fuel assembly, the first fuel assembly component being wire wrapped at a first pitch; and locating a second fuel assembly component within an outermost ring of the fuel assembly, the second fuel assembly component being wire wrapped at a second pitch smaller than the first pitch.

In some cases, the step of locating the second fuel assembly component within an outermost ring of the fuel assembly includes locating a plurality of second fuel assembly components within the outermost ring of the fuel assembly, wherein each of the plurality of second fuel assembly components is wire wrapped at the second pitch.

The method may further include locating a third fuel assembly component within a penultimate ring of the fuel assembly, the third fuel assembly component being wire wrapped at the second pitch.

In some embodiments, the second pitch includes twice the number of wraps as the first pitch. In some cases, the second pitch may include four times the number of wraps as the first pitch.

The first fuel assembly component may have a first clocking angle, and wherein the step of locating the second fuel assembly component further includes positioning the second fuel assembly component to have a second clocking angle different from the first clocking angle.

In some cases, the method further includes using a second fuel assembly component that has a second wire wrap at the second pitch.

According to some examples of the method, the first fuel assembly component may include one or more of fissionable fuel, fertile fuel, a neutron absorber, or a neutron reflector.

In some cases, the first fuel assembly component is wrapped with a first wire having a first diameter and wherein the second fuel assembly component is wire wrapped with a second wire having a second diameter smaller than the first diameter. In some cases, the second fuel assembly component that is wire wrapped with the second wire having a second diameter smaller than the first diameter has a cross-sectional dimension that is greater than a cross-sectional dimension of a first fuel assembly component that is wrapped with a wire having a larger diameter. In other words, the second fuel assembly component may be fatter than the first fuel assembly component, which in some cases, the difference in size may be commensurate with the difference in wire diameters.

The method may further include locating a third fuel assembly component within a penultimate ring of the fuel assembly, the third fuel assembly component being wire wrapped at the second pitch.

DETAILED DESCRIPTION

This disclosure generally relates to nuclear fuel pins, nuclear fuel pin bundles, nuclear fuel assemblies, and nuclear reactor cores in which the nuclear fuel pins have wire wrappings of differing pitches depending on their respective location within the nuclear fuel assembly.

A wire-wrapped fuel bundle is one-type of nuclear fuel assembly that may be used in sodium cooled fast reactors (SFRs). In many cases, an SFR uses an aggregate form of a dense triangular array to reduce the deceleration and loss of neutrons. The wire wrapping around the fuel pin is used the enhance mixing of the coolant between subchannels and provides support and spacing between the fuel pins.

Figure 1:
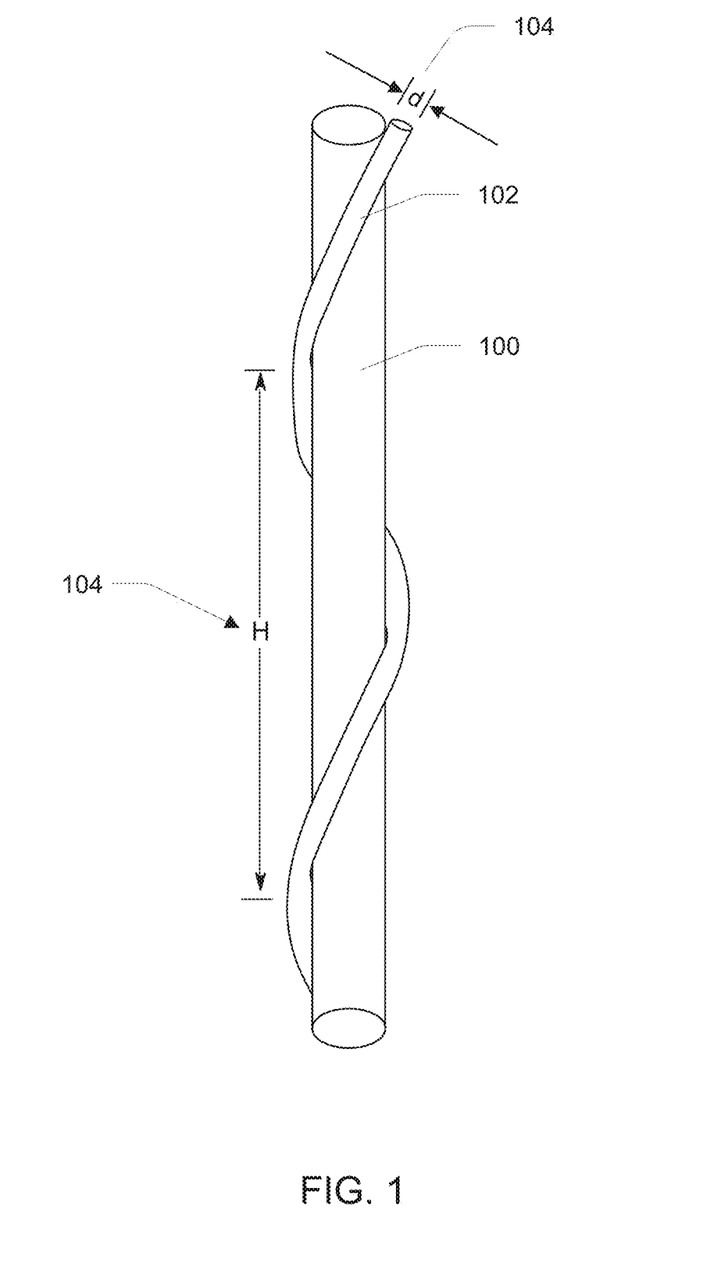
FIG. 1 is a schematic representation of a wire-wrapped fuel pin, in accordance with some embodiments.

With reference to FIG. 1, a fuel pin 100 is shown having a circular cross section. The fuel pin 100, at some point during its manufacture, will have nuclear fuel placed therein. A wire 102 is wrapped around the fuel pin in a helical fashion to create the wire-wrapped fuel pin. The wire has a diameter d 104, and a pitch H 106. In some cases, the pitch 106 is 1:1, or in other words, the wire 102 makes one full revolution around the fuel pin along the length of the fuel pin. The pitch may be characterized as a length along the fuel pin required for the wire to make a complete revolution. For example, a pitch of 15 cm indicates the length along the fuel pin required for the wire to make a complete helical revolution. The pitch may also be characterized as the number of complete wire revolutions along the length of the fuel pin.

Figure 2:
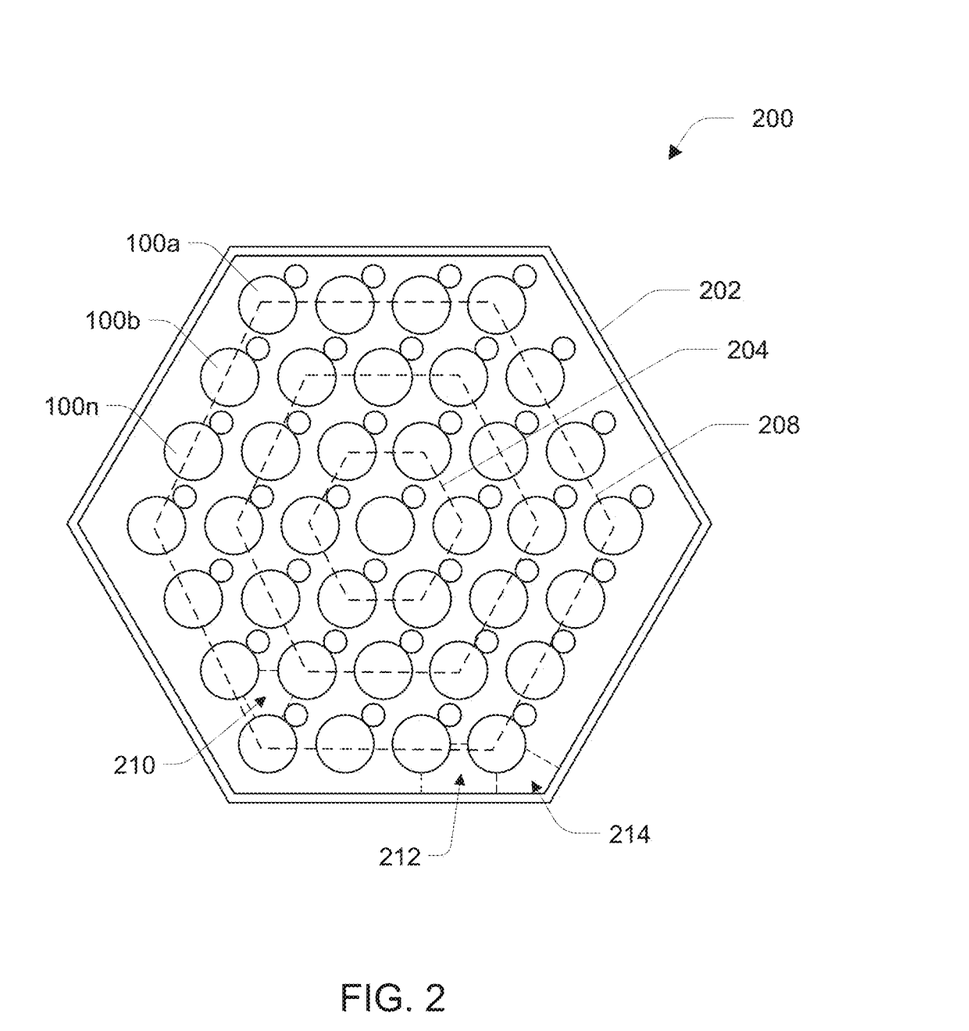
FIG. 2 is a view in transverse cross section of a nuclear fuel assembly or nuclear fission module, in accordance with some embodiments.

With reference to FIG. 2, a nuclear fuel assembly 200 is shown schematically in which a number of fuel pins 100a, 100b, 100n are located within a fuel duct 202. Typically, fuel pins are arranged in rings around a central pin. The fuel pins 100 may be arranged in a first ring 204, a second ring 206, a third ring 208, and additional rings. As an example, the illustrated fuel assembly 200 is arranged in 3 rings, thereby defining a 37-pin fuel bundle. Of course, other fuel bundle architectures are contemplated herein, such as, for example, a 19-pin fuel bundle, a 61-pin fuel bundle, a 91-pin fuel bundle, a 127-pin fuel bundle, a 169-pin fuel bundle, a 217-pin fuel bundle, a 271-pin fuel bundle, a 331-in fuel bundle, and other arrangements.

The triangular packing of the fuel pins 100 creates subchannels between the fuel pins to allow coolant to flow therein. Interior subchannels 210 have a boundary defined by three fuel pins. Edge subchannels 212 have a boundary defined by two fuel pins and the assembly duct. Corner subchannels 214 have a boundary defined by one fuel pin and a corner of the fuel duct 202.

While the wire wrap increases the coolant mixing in the subchannels and reduces the peak temperature of the fuel cladding, it also creates a temperature gradient across the fuel assembly and an increased pressure loss of the fuel assembly.

The amount of temperature distribution in a fuel bundle is proportional to the subchannel area. An edge subchannel 212 typically has more cross-sectional area than an interior subchannel 210, and therefore will typically have a lower temperature as a larger volume of coolant is able to flow through the edge subchannel with less restriction. The result is thermodynamic effects in the fuel assembly that vary from pin to pin dependent upon the ring in which the pin is located. For purposes of example, a hexagonal fuel assembly will be shown and described, although the concepts presented herein are not limited to hexagonal fuel assemblies as the phenomena and concepts are equally applicable to fuel assemblies having other cross-sections and arrangements. In addition, as an example, a sodium cooled fast reactor will be described; however, the concepts and technology described herein are not limited to sodium fast reactors as the concept may be applicable to other types of reactors, both in the thermal spectrum and the fast spectrum, and reactors utilizing other types of coolants.

Figure 3:
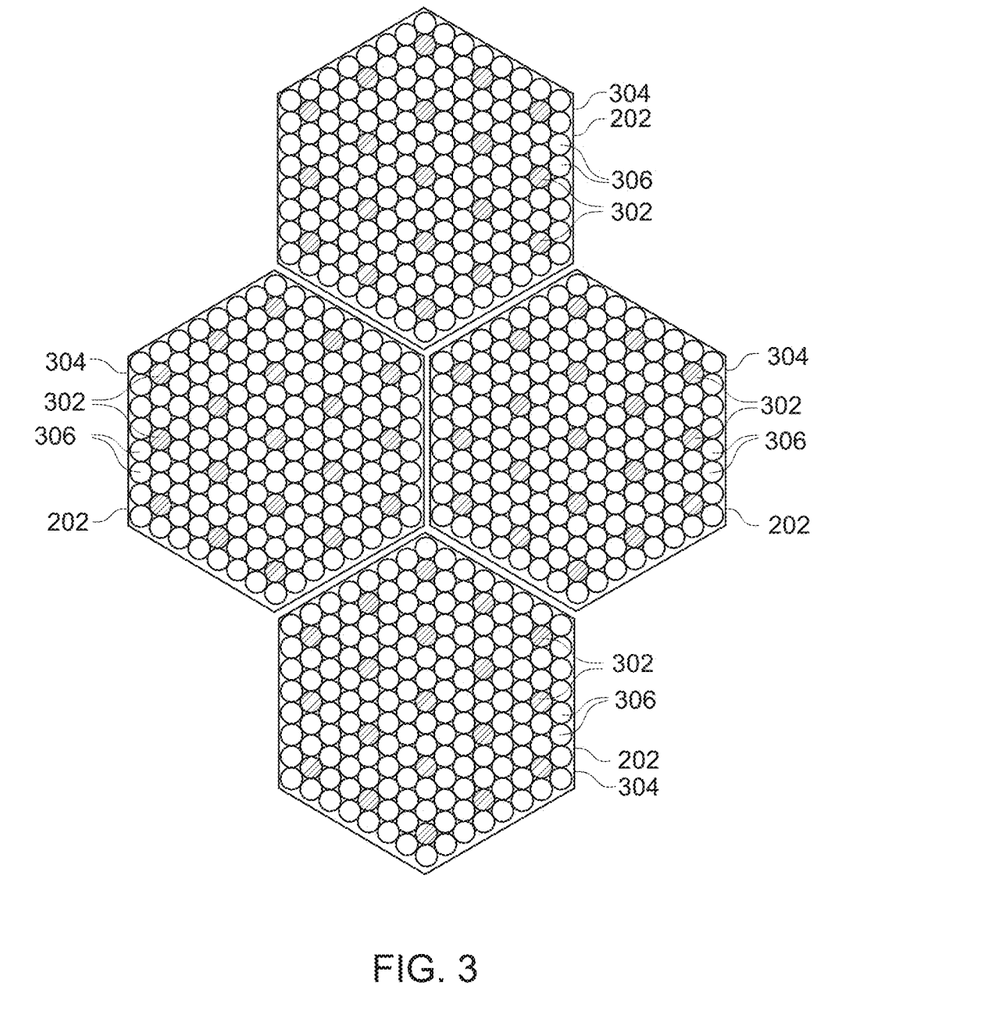
FIG. 3 is a view in transverse cross section of a plurality of adjacent hexagonally shaped nuclear fission modules, in accordance with some embodiments.

FIG. 3 illustrates a plurality of nuclear fission modules containing fuel assembly components such as one or more of nuclear fuel pins containing fissionable fuel, fertile fuel, or a combination; control rods; and/or neutron reflectors. While any of the components within the nuclear fission module may be wire wrapped, for ease of description, wire wrapping will be described in relation to fuel pins, although it should be appreciated that when referring to wire-wrapped fuel pins, the description could also be applied to other fuel assembly components and the portions of the description identifying fuel pins does so as an example.

Regardless of the configuration chosen for a reactor core, a plurality of spaced-apart, longitudinally extending and longitudinally movable control rods 302 may be symmetrically disposed within a control rod guide tube or cladding (not shown), extending the length of a predetermined number of nuclear fission modules 304. Control rods 302, which are shown disposed in a predetermined number of the hexagonally-shaped nuclear fission modules 304, control the neutron fission reaction occurring in nuclear fission modules 304. Control rods 302 comprise a suitable neutron absorber material having an acceptably high neutron absorption cross-section. In this regard, the absorber material may be a metal or metalloid selected from the group consisting essentially of lithium, silver, indium, cadmium, boron, cobalt, hafnium, dysprosium, gadolinium, samarium, erbium, europium and mixtures thereof. Alternatively, the absorber material may be a compound or alloy selected from the group consisting essentially of silver-indium-cadmium, boron carbide, zirconium diboride, titanium diboride, hafnium diboride, gadolinium titanate, dysprosium titanate and mixtures thereof. Control rods 302 will controllably supply negative reactivity to reactor core. Thus, control rods 302 provide a reactivity management capability to a reactor core. In other words, control rods 302 are capable of controlling or are configured to control the neutron flux profile across the reactor core and thus influence the temperature profile across the reactor core. The control rods may be wire wrapped as described herein and a first control rod may be wire-wrapped with a first pitch, and a second control rod may be wire-wrapped with a second pitch.

It should be appreciated that nuclear fission module 304 need not be neutronically active. In other words, nuclear fission module 304 need not contain any fissile material. For example, nuclear fission module 304 may be a purely reflective assembly or a purely fertile assembly or a combination of both. In this regard, nuclear fission module 304 may be a breeder nuclear fission module comprising nuclear breeding material or a reflective nuclear fission module comprising reflective material. In this case, a nuclear fission module 304 may include fission module components that are wire wrapped with a constant pitch and clocking angle. Alternatively, in one embodiment, nuclear fission module 304 may contain fuel pins 306 in combination with nuclear breeding rods or reflector rods. For example, a plurality of fertile nuclear breeding rods may be disposed in nuclear fission module 304 in combination with fuel pins 306. Control rods 302 may also be present. The fertile nuclear breeding material in nuclear breeding rods may be thorium-232 and/or uranium-238, or any other suitable fertile breeding material. In this manner, nuclear fission module 304 may define a fertile nuclear breeding assembly. In some cases, a plurality of neutron reflector rods are disposed in nuclear fission module 304 in combination with fuel pins 306. Control rods 302 may also be present. The reflector material may be a material selected from the group consisting essentially of beryllium (Be), tungsten (W), vanadium (V), depleted uranium (U), thorium (Th), lead alloys and mixtures thereof. Also, reflector rods may be selected from a wide variety of steel alloys. In this manner, nuclear fission module 304 may define a neutron reflector assembly. Moreover, it may be appreciated by a person of ordinary skill in the art of nuclear in-core fuel management that nuclear fission module 304 may include any suitable combination of nuclear fuel pins 306, control rods 302, breeding rods and reflector rods. In any combination of the disclosed nuclear fuel assembly components, the individual rods may be wire wrapped, as disclosed herein. The combinations of rods may be formed in a hexagonal matrix and rely, at least in part, on wire wrappings to create space between the various rods. The wire wrappings on the fuel assembly components may be wrapped at a first pitch, a second pitch, a third pitch, a fourth pitch, or some other configuration.

As pressure varies across a fission module, temperature varies proportionally. The pressure loss due to the flow friction along a smooth pipe may be calculated as:

$$\Delta P = f \cdot \left(\frac{L}{d_h}\right) \cdot 0.5 \cdot \rho \cdot v^2$$

Where ρ is the density, v is the mean velocity of the coolant, L is the tube length, and do is the hydraulic diameter of the flow channel. A friction factor may be calculated as a function of Reynolds number, but it is generally accepted that a lower pitch wire wrap value will correlate with a higher friction along a subchannel. Thus, reducing the pitch value will increase the friction factor.

In the contact region between the fuel pin and the spacer wire, the coolant flow velocity is significantly reduced, especially in the wake of the spacer wire. At these locations, the fuel pin surface may heat up beyond the vapor temperature of the coolant which can affect the neutron flux. According to the relevant literature, it is accepted that without a mixing device, the departure from nucleate boiling occurs primarily on the central fuel pin and then preferentially at locations facing azimuthally on the adjacent fuel pins. With a mixing device, such as the wrapped wire, the critical heat flux is higher; however, the location of departure from nucleate boiling is dependent on at least the pressure and mass velocity of the coolant. According to some embodiments, the coolant is caused to flow from the edge subchannels toward the interior subchannels to alleviate the effects of the departure from nucleate boiling and providing for an increased critical heat flux.

The coolant flow in nuclear fission modules is primarily a directional flow in an axial direction with a secondary flow in the subchannels. The directional flow may be disturbed by the spacer wire which causes the flow to follow the spacer wire rotation about the fuel pin and a turbulent flow in the wake of the wire. In many prior cases, the clocking of the wire wrap remained constant across the fuel pins in the fuel assembly. Clocking, or clocking angle, refers to the start point of the wire wrap on the fuel pin. For example, as shown in FIG. 2, the fuel pins have a constant start clocking angle in which the wire wrap is shown at a 2:00 position. Further, the pitch of the wire wrap is consistent across all the fuel pins in order to create a hexagonal mesh that avoids wire to wire interference contact points.

In view of these parameters, the fuel pin may experience a local maximum temperature $T_{max}$ and the fuel assembly experiences an average outlet temperature $T_{avg}$. In general, the $T_{max}$ experienced by a fuel pin should be controlled so as to not exceed the thermomechanical stress and strain limits on the fuel pin, and to also manage the pin to pin interaction caused by radial swelling, axial deformation, bending, and the like.

The fuel assembly, as a whole, additionally experiences a $T_{max}$ at certain hotspots that are preferably constrained to remain below the thermomechanical limits of the components in the fuel assembly. It would be advantageous to decrease the temperature difference (ΔT) between the $T_{max}$ and $T_{avg}$ of the fuel assembly, which as a net effect, would increase the overall outlet temperature while maintaining a $T_{max}$ within the thermomechanical design limits and without substantially increasing the peak temperature of the fuel pin cladding.

In order to achieve these advantages, according to some embodiments, at least some of the fuel assembly components within the fuel assembly (e.g. fuel pins, control rods, etc.) may be wire wrapped with a different pitch than other fuel assembly components. For example, according to some embodiments, an outermost ring of wire wrapped fuel assembly components has a shorter pitch than inner rings of fuel assembly components. Similarly, a penultimate ring of wire wrapped fuel assembly components may have a shorter pitch than inner rings of fuel assembly components. Notably, the penultimate ring of wire wrapped fuel assembly components may have a different pitch than the outer ring of fuel assembly components. As used herein, the term fuel assembly component is a broad term and refers to any component that may be placed within a fuel assembly, and includes, without limitation, fissile fuel rods, fertile fuel rods, neutron reflectors, control rods, and in many cases, each of these fuel assembly components may be shaped to be interchangeable with other fuel assembly components. The description will largely use fuel pins and exemplary fuel assembly components, but it should be appreciated that the description using fuel pins as an example should not be so limited, especially in those instances in which fuel pins are sized and shaped to be interchangeable with other fuel assembly components.

In some examples, the difference in pitch between adjacent fuel assembly components is a half-pitch difference. For example, inner rings of fuel assembly components may have, as an example, a pitch of 50 cm. In other words, the wire wrapping makes one complete revolution every 50 cm along the axial length of the fuel pin. A penultimate ring of fuel assembly components may have a pitch of 25 cm (half of 50 cm), and an outer ring of fuel assembly components may have a pitch of 12.5 cm (half of 25 cm). Of course, other pitches are contemplated herein, as are the number of different pitches, which are not limited to 3 different pitches, or 2 different pitches.

Figure 4:
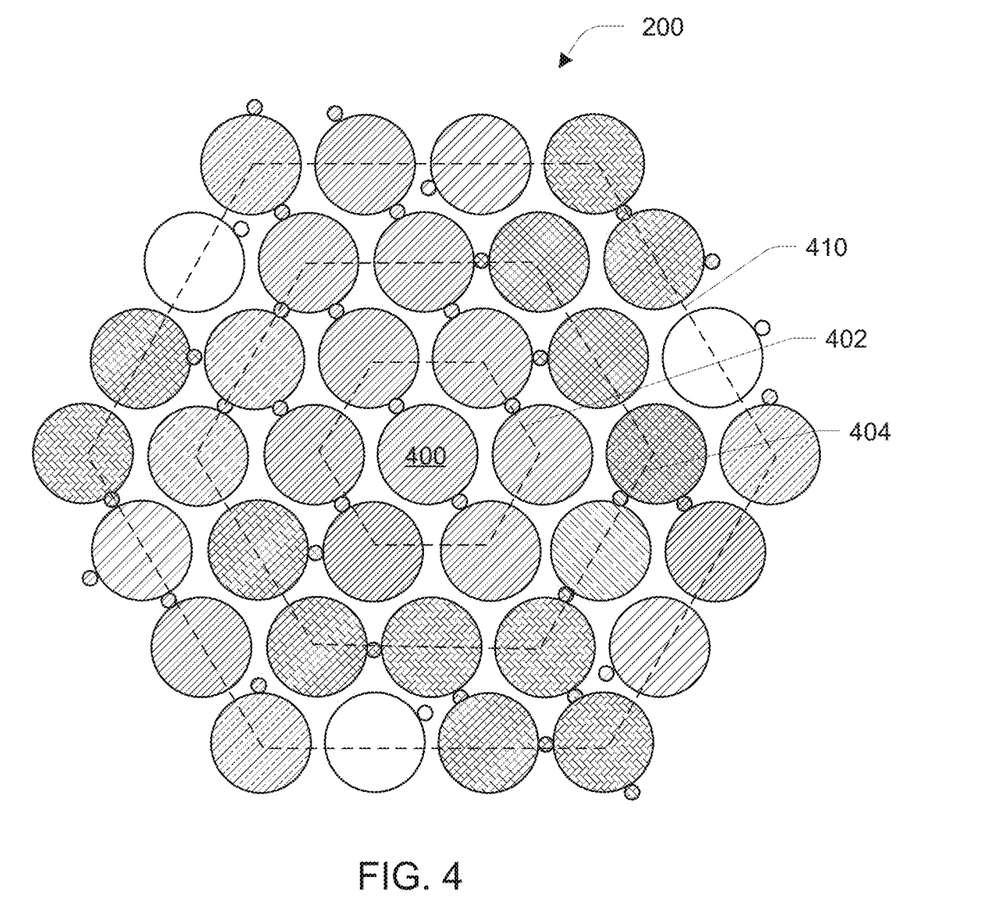
FIG. 4 illustrates in transverse cross section of a plurality of rods, in accordance with some embodiments.

As show in in FIG. 4, a fuel assembly 200 embodying a multi-pitch wire wrap, as shown, allows an increased outlet temperature without increasing an overall pressure drop or exceeding the $T_{max}$ thermomechanical design limits of the fuel assembly 200.

According to some embodiments, a central fuel pin 400 and a first ring of fuel pins 402 may be formed with a wire wrapping having a first clocking angle and a first pitch. An outer ring of fuel pins 410 may be formed wherein one or more of the outer ring of fuel pins is wire-wrapped at a second pitch. In some cases, one or more of the outer ring of fuel pins 410 has a clocking angle different than the first clocking angle. In typical wire wrapped fuel assemblies, wire is wrapped helically around the fuel pin with a constant pitch and a constant clocking angle, which makes avoiding wire to wire interference straight forward. However, when varying the clocking angle or the pitch of the wire wrap, it becomes more difficult to avoid wire to wire interference. Similarly, one or more fuel pins in a penultimate ring of fuel pins 404 may have a second pitch, or a third pitch.

According to some embodiments, a solution is presented to avoid wire to wire interference while utilizing two or more pitches by varying the clocking angle. Such a solution is shown in FIG. 4 with reference to a 37-pin example fuel bundle. In some cases, many or most of the fuel pins that cooperate to define interior subchannels are formed with a constant first pitch and typical wire wrap, which may include 1 turn, 2 turns, 3 turns, 4 turns, 5 turns, 6 turns, 7 turns, 8 turns, 9 turns, or more helical turns of wire wrap along the length of the fuel pin. As an example, some typical wire wrap pitches are between about 8 cm and about 100 cm. That is, the wire wrapping makes a complete helical revolution around the fuel pin between about every 8 cm of its axial length to about 100 cm of its axial length. Of course, these values are examples and other pitches are entirely possible based upon the concepts presented herein.

In some cases, one or more fuel pins of an outer ring 410 may be formed with a wire wrap at a second pitch, different from the first pitch. In some cases, the second pitch varies from the first pitch by a factor of 0.5, or some integer multiple of the factor. For instance, where the first pitch is 40 cm, the second pitch may be 20 cm. In some cases, the second pitch is half the first pitch, one fourth of the first pitch, or some other integer multiplier of the factor. Similarly, one or more fuel pins of a penultimate ring 404 may be formed with the second pitch, or with a third pitch, different from the first pitch and second pitch. Of course, other factors may be used to vary the pitch between fuel pins, and a solution to avoid wire to wire interference may be determined by varying the clocking angle.

According to some embodiments, fuel pins associated with an outer ring of fuel pins 410 have a shorter pitch than inner rings of fuel pins. In some cases, the two outermost rings have a shorter pitch than inner rings of fuel pins. According to some embodiments, the shorter pitch toward the outer rings increases pressure drop in the edge subchannels and corner subchannels which has been shown to even out the temperature distribution across the fuel assembly, thus decreasing the ΔT and increasing outlet temperature. In many cases, there is a valuable increase in outlet temperature without increasing peak temperature of the cladding, which provides substantial benefits. For instance, in some cases, increasing the pressure drop at the subchannels adjacent the fuel assembly duct has been shown to increase outlet temperature by 20° C. which can result in a 1% efficiency increase in plant operation.

In addition, there are numerous benefits beyond thermal hydraulics. For example, decreasing the pitch of the outer ring of fuel pins decreases the pin to duct interactive forces by adding additional points of contact along the fuel duct. Thus, the interaction between the pin and the duct is spread across a greater surface area by virtue of additional points of contact between the wire and the duct. The practical result is that a fuel pin can experience increased thermal strain without causing excessive pin to duct interaction.

Figure 5:
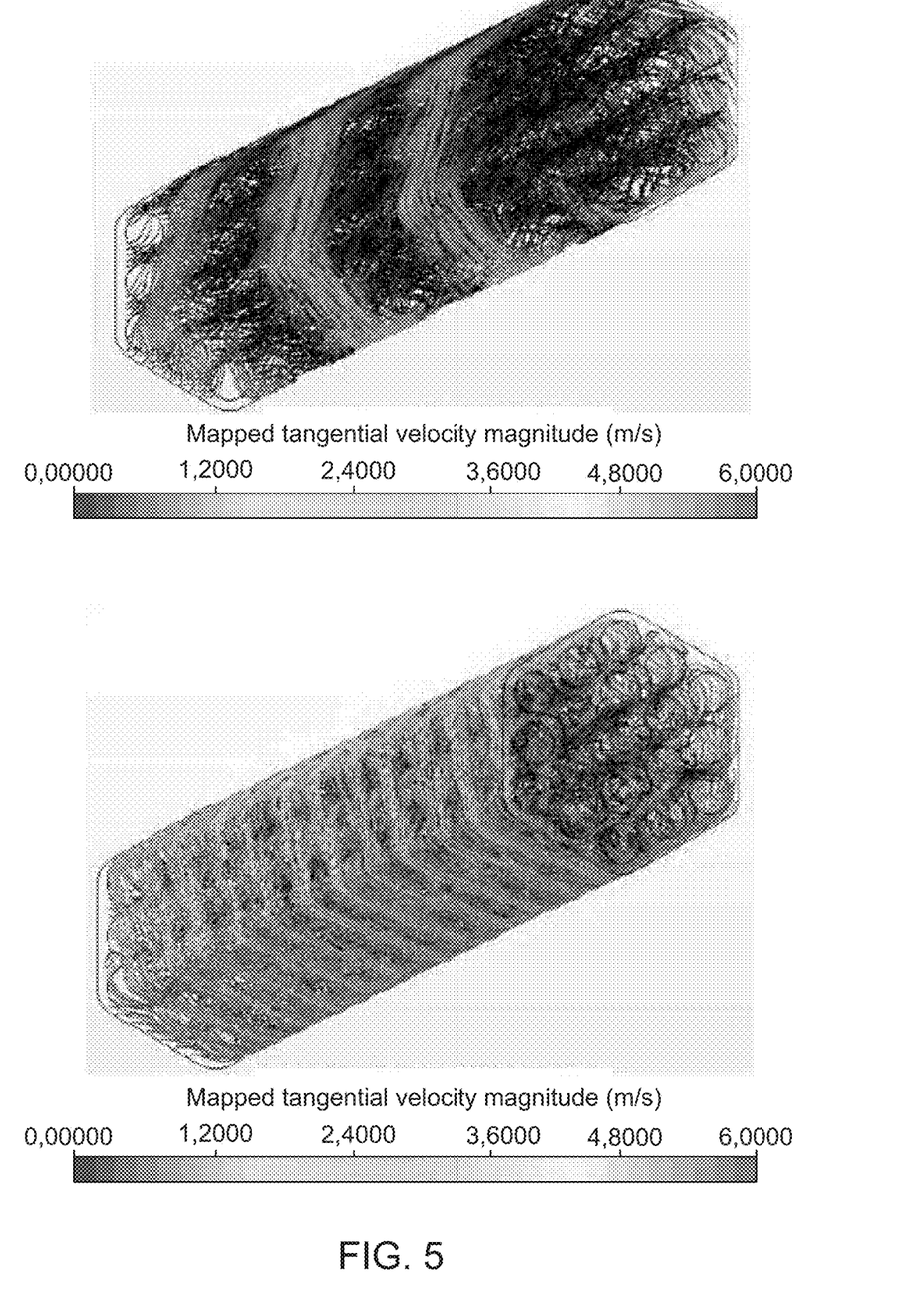
FIG. 5 illustrates the results of computational fluid dynamics showing improved thermo hydraulic properties, in accordance with some embodiments.

With reference to FIG. 5, computational fluid dynamics ("CFD") modeling was performed on a 19-pin fuel assembly in which an outer ring of fuel pins was modeled with a pitch that is half of the pitch length of the inner rings of fuel pins. This results in more flow being directed at an angle further from the main flow direction. This effect provides more pressure drop in the outer channels and tends to push cooler edge fluid back into the assembly away from the edge channels, thereby providing more efficient mixing of the coolant and reducing the ΔT across the fuel assembly.

In one example, an outer ring and a penultimate ring of fuel pins was modeled with a half-length pitch, which resulted in a 7.6° C. reduction between $T_{max}$ and $T_{avg}$. In another example, an outer ring of fuel pins was modeled with a quarter length pitch as compared to inner rings of fuel pins, which resulted in a 21° C. reduction in ΔT. It is believed that the area of the edge and corner subchannels compared with the area of the interior subchannels indicates that this approach is also effective for larger bundle sizes, such as 169 pins, 217 pins, 271 pins, or other sizes of fuel bundles.

According to some embodiments, increasing the pressure drop in the edge subchannels and corner subchannels forces the coolant flow toward the interior subchannels of the fuel bundle. The pressure drop can be increased by providing one or more fuel pins with a wire wrapped at a shorter pitch than other fuel pins. The pressure drop in the edge and corner subchannels can also be increased by providing one or more fuel pins toward the outer ring or penultimate ring with a wire having a smaller diameter. Additionally or alternatively, the fuel assembly components wrapped with thinner diameter wire can be made to have a greater cross-sectional diameter as compared with other fuel assembly components that have a relatively thicker wire. This has the effect of making the edge and corner subchannels smaller as the fuel assembly components are closer together due to the smaller diameter spacer wire, which has the further effect of increasing neutron flux (and temperature) at these locations. In other examples, the flow in the edge and corner subchannels can be reduced by applying one or more of d-spacers, dummy pins, or other displacement elements even while optionally maintaining the same wire pitch across all the fuel assembly components.

While the description has focused on the wire wrap pitch of fuel pins, it should be appreciated that a solution to a multi-pitch wire wrap fuel bundle may include a multi-pitch wire wrap to other components within the fuel bundle, such as control rods, fertile fuel rods, reflector rods, and the like. These terms may be referred to as "fuel assembly components." Thus, interior fuel assembly components may be wire-wrapped at a first pitch, and exterior fuel assembly components may be wire wrapped at a second pitch, shorter than the first pitch. The exterior fuel assembly components include fuel assembly components located at the outer ring of the fuel assembly, the penultimate ring of the fuel assembly, and/or the antepenultimate ring. For clarification, the penultimate ring is the hexagonal ring of fuel assembly components that is adjacent to the outermost ring. The antepenultimate ring is the hexagonal ring of fuel assembly components that is third from the outermost ring. The preantepenultimate ring is the hexagonal ring of fuel assembly components that is the fourth from the outermost ring. According to some embodiments, one or more fuel assembly components in the antepenultimate ring are wire wrapped at a different pitch than fuel assembly components of an inner ring. According to some embodiments, one or more fuel assembly components in the preantepenultimate ring are wire wrapped at a different pitch than fuel assembly components of an inner ring. In some cases, one or more of the fuel assembly components in the outer ring, the penultimate ring, the antepenultimate ring, and/or the preantepenultimate ring are wire wrapped at a different pitch than other fuel assembly components in adjacent rings, and may be wrapped at a different pitch than fuel assembly components located within inner rings. For instance, the inner fuel assembly components may be wire wrapped at a first pitch, the antepenultimate fuel assembly components may be wire wrapped at a second pitch shorter than the first pitch, the penultimate fuel assembly components may be wire wrapped at a third pitch shorter than the second pitch, and/or the outermost fuel assembly components may be wrapped at a fourth pitch shorter than the third pitch.

In some embodiments, the inner rings are the hexagonal rings of fuel assembly components that are positioned closer to the center of the fuel assembly than the outer rings of fuel assembly components. According to some embodiments, the inner rings of fuel assembly components are wire wrapped with a first pitch and the outermost ring of fuel assembly components are wire wrapped with a second pitch, the second pitch being shorter than the first pitch. In some cases, the penultimate ring of fuel assembly components is also wire wrapped at the second pitch.

In order to avoid wire to wire interference, the clocking angle of one or more fuel assembly components may be offset from other one or more fuel assembly components, such as shown in FIG. 4. It is believed that there are solutions to each wire wrapped fuel assembly utilizing two or more pitches by varying the clocking angle to avoid wire to wire interference. A clocking-angle solution to multi-pitch wire wrapped fuel assembly components is shown in FIGS. 4 and 5 where a solution has been presented and modeled, which shows substantial impacts to the outlet temperature.

According to some examples, one or more inner rings of fuel assembly components are wire-wrapped with a first pitch, an outer ring of fuel assembly components are wire wrapped with a second pitch, different from the first pitch, and one or more other fuel assembly components are wire wrapped with a third pitch different from the first pitch and the second pitch. In some embodiments a first fuel assembly component is wire wrapped at a first pitch, a second fuel assembly component is wire wrapped at a second pitch, and a third fuel assembly component is wire wrapped at a third pitch. For example, the pitch can be halved between the first, second, and third fuel assembly component and result in a solution to avoid wire to wire interference between adjacent pins. As an example, one or more inner fuel assembly components can be wire wrapped at a 30 cm pitch, a penultimate ring of fuel assembly components can be wire wrapped at a 15 cm pitch (half of 30 cm), and an outer ring can be wire wrapped at a 7.5 cm pitch (half of 15 cm) and a solution can be obtained to avoid wire to wire interference between adjacent fuel assembly components.

In some examples, the inner rings of fuel assembly components are wire wrapped at a first pitch and starting at a first clocking angle. According to some embodiments is the outermost ring of fuel assembly components is wire wrapped at a second pitch different from the first pitch and at a variable clocking angle that is either equal to the first clocking angle or rotated by 30° or 60° increments from the first clocking angle. In some embodiments, the second pitch is either equal to the first clocking angle or rotated by 30° increments from the first clocking angle. In some embodiments, the second pitch is either equal to the first clocking angle or rotated by 60° increments from the first clocking angle. In some embodiments, the second pitch is either equal to the first clocking angle or rotated by 120° increments from the first clocking angle. In some embodiments, the second pitch may be the same as the first clocking angle or may be rotated by 45° increments from the first clocking angle.

The described embodiments are especially relevant for reactor designs in which the reactor outlet temperature may be lower than desired. Utilizing a different pitch of wire wrap on at least some of the fuel pins, as described herein, can cause an increase in outlet temperature to a desired outlet temperature.

According to some embodiments, a method for increasing the pressure drop at the edge subchannels and corner subchannels includes providing fuel assembly components at an outer ring location in the fuel assembly that are wire wrapped at a second pitch that is smaller than wire wrapped fuel assembly components at an interior ring location.

The disclosure sets forth example embodiments and, as such, is not intended to limit the scope of embodiments of the disclosure and the appended claims in any way. Embodiments have been described above with the aid of functional building blocks illustrating the implementation of specified functions and relationships thereof. The boundaries of these functional building blocks have been arbitrarily defined herein for the convenience of the description. Alternate boundaries can be defined to the extent that the specified functions and relationships thereof are appropriately performed.

The foregoing description of specific embodiments will so fully reveal the general nature of embodiments of the disclosure that others can, by applying knowledge of those of ordinary skill in the art, readily modify and/or adapt for various applications such specific embodiments, without undue experimentation, without departing from the general concept of embodiments of the disclosure. Therefore, such adaptation and modifications are intended to be within the meaning and range of equivalents of the disclosed embodiments, based on the teaching and guidance presented herein. The phraseology or terminology herein is for the purpose of description and not of limitation, such that the terminology or phraseology of the specification is to be interpreted by persons of ordinary skill in the relevant art in light of the teachings and guidance presented herein.

The breadth and scope of embodiments of the disclosure should not be limited by any of the above-described example embodiments, but should be defined only in accordance with the following claims and their equivalents.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The specification and annexed drawings disclose examples of systems, apparatus, devices, and techniques that may provide control and optimization of separation equipment. It is, of course, not possible to describe every conceivable combination of elements and/or methods for purposes of describing the various features of the disclosure, but those of ordinary skill in the art recognize that many further combinations and permutations of the disclosed features are possible. Accordingly, various modifications may be made to the disclosure without departing from the scope or spirit thereof. Further, other embodiments of the disclosure may be apparent from consideration of the specification and annexed drawings, and practice of disclosed embodiments as presented herein. Examples put forward in the specification and annexed drawings should be considered, in all respects, as illustrative and not restrictive. Although specific terms are employed herein, they are used in a generic and descriptive sense only, and not used for purposes of limitation.

Those skilled in the art will appreciate that, in some implementations, the functionality provided by the processes, systems, and arrangements discussed above may be provided in alternative ways. The various methods, configurations, and arrangements as illustrated in the figures and described herein represent example implementations. From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A fuel assembly for a nuclear reactor, comprising:
    a first set of fuel pins, each of the first set of fuel pins having a longitudinal axis, and further having a first wire wrapping in a first rotational direction about the longitudinal axis, the first wire wrapping having a first pitch that avoids contact between the first wire wrapping of individual fuel pins of the first set of fuel pins; and
    a second set of fuel pins, each of the second set of fuel pins having a longitudinal axis, and further having a second wire wrapping in the first rotational direction about the longitudinal axis, the second wire wrapping having a second pitch that avoids contact between the second wire wrapping of individual fuel pins of the second set of fuel pins, the second pitch being different than the first pitch;
    and wherein the first wire wrapping and the second wire wrapping have a clocking angle that avoids contact between the first wire wrapping of the first set of fuel pins and the second wire wrapping of the second set of fuel pins.

2. The fuel assembly as in claim 1, wherein the second pitch is shorter than the first pitch.

3. The fuel assembly as in claim 1, wherein the first set of fuel pins and the second set of fuel pins are located within a fuel duct and wherein the second set of fuel pins is positioned closer to a wall of the fuel duct than the first set of fuel pins.

4. The fuel assembly as in claim 1, wherein the second set of fuel pins is positioned within a fuel duct to increase an outlet temperature of the nuclear reactor.

5. The fuel assembly as in claim 1, wherein a first fuel pin of the first set of fuel pins has a first clocking angle, and wherein a second fuel pin of the first set of fuel pins has a second clocking angle different from the first clocking angle.

6. The fuel assembly as in claim 1, wherein the fuel assembly comprises fissionable fuel.

7. The fuel assembly as in claim 1, wherein the fuel assembly comprises fertile fuel.

8. The fuel assembly as in claim 1, further comprising a neutron absorber, the neutron absorber having a third wire wrapping having the second pitch.

9. The fuel assembly as in claim 1, wherein the first set of fuel pins and the second set of fuel pins are oriented in rings about a center of the fuel assembly.

10. The fuel assembly as in claim 9, wherein the second set of fuel pins is positioned further from the center of the fuel assembly than the first set of fuel pins.

11. The fuel assembly as in claim 10, wherein the second set of fuel pins is positioned in an outermost ring within the fuel assembly.

12. The fuel assembly as in claim 10, wherein the second set of fuel pins is positioned in a penultimate ring within the fuel assembly.

13. The fuel assembly as in claim 1, wherein the second pitch is an integer multiplier of the first pitch.

14. The fuel assembly as in claim 1, wherein the second pitch is half of the first pitch.

* * * * *